United States Patent
Forkey et al.

(10) Patent No.: US 7,715,105 B2
(45) Date of Patent: *May 11, 2010

(54) ACYLINDRICAL OPTICAL DEVICE

(75) Inventors: Richard E. Forkey, Westminster, MA (US); Richard G. Cyr, New Ipswich, NH (US); Robert N. Ross, Gardner, MA (US); Joseph N. Forkey, Princeton, MA (US)

(73) Assignee: Precision Optics Corporation, Gardner, MA (US)

( * ) Notice: Subject to any disclaimer, the term of this patent is extended or adjusted under 35 U.S.C. 154(b) by 607 days.

This patent is subject to a terminal disclaimer.

(21) Appl. No.: 11/461,814

(22) Filed: Aug. 2, 2006

(65) Prior Publication Data
US 2006/0262415 A1 Nov. 23, 2006

Related U.S. Application Data

(63) Continuation-in-part of application No. 10/659,727, filed on Sep. 10, 2003, now Pat. No. 7,116,486.

(51) Int. Cl.
*G02B 3/00* (2006.01)
*G02B 7/00* (2006.01)
*G02B 9/00* (2006.01)
*G02B 11/00* (2006.01)
*G02B 13/00* (2006.01)
*G02B 15/00* (2006.01)
*G02B 17/00* (2006.01)
*G02B 25/00* (2006.01)

(52) U.S. Cl. .................................................. 359/642
(58) Field of Classification Search .......... 359/633–642
See application file for complete search history.

(56) References Cited

U.S. PATENT DOCUMENTS

| 3,204,326 | A | 9/1965 | Granitsas |
| 3,329,074 | A | 7/1967 | Gosselin |
| 4,382,803 | A | 5/1983 | Allard |
| 5,122,650 | A | 6/1992 | McKinley |
| 5,157,553 | A | 10/1992 | Phillips et al. |
| 5,223,974 | A | 6/1993 | Phillips et al. |
| 5,439,578 | A | 8/1995 | Dovichi et al. |
| 5,461,444 | A | 10/1995 | Okura et al. |
| 5,530,940 | A | 6/1996 | Ludwig et al. |
| 5,584,982 | A | 12/1996 | Dovichi et al. |
| 5,603,687 | A | 2/1997 | Hori et al. |
| 5,613,769 | A | 3/1997 | Parkyn, Jr. et al. |
| 5,662,817 | A | 9/1997 | Honmou |

(Continued)

FOREIGN PATENT DOCUMENTS

DE 9200876 4/1993

(Continued)

*Primary Examiner*—Scott J Sugarman
*Assistant Examiner*—Brandi N Thomas
(74) *Attorney, Agent, or Firm*—George A. Herbster

(57) ABSTRACT

A lens structure and method for manufacture of such a lens. A lens element has multiple sawn planar faces between image forming surfaces so the lens element has a polygonal cross section. The manufacture includes the step of utilizing oversized conventional cylindrical lens elements and other optical elements formed into lens systems. The faces are sawn to reduce the overall size. The sawing can be applied to integral lens elements or assemblies or lens arrays.

8 Claims, 16 Drawing Sheets

U.S. PATENT DOCUMENTS

| | | |
|---|---|---|
| 5,673,147 A | 9/1997 | McKinley |
| 5,680,260 A | 10/1997 | Farcella et al. |
| 5,741,412 A | 4/1998 | Dovichi et al. |
| 5,751,341 A | 5/1998 | Chaleki et al. |
| 5,760,976 A * | 6/1998 | DeLaMatyr et al. ......... 359/820 |
| 5,993,294 A | 11/1999 | Gottschald |
| 6,049,430 A | 4/2000 | Heanue et al. |
| 6,088,157 A | 7/2000 | Mazurkewitz |
| 6,219,182 B1 | 4/2001 | McKinley |
| 6,305,194 B1 | 10/2001 | Budinski et al. |
| 6,434,976 B1 | 8/2002 | Yoshida et al. |
| 6,822,803 B2 | 11/2004 | Muto et al. |
| 6,832,946 B2 | 12/2004 | Hatano |
| 2002/0013532 A1 | 1/2002 | Czubko et al. |
| 2002/0087047 A1 | 7/2002 | Remijan et al. |
| 2004/0165095 A1 | 8/2004 | Shimizu et al. |
| 2005/0036748 A1 | 2/2005 | Freeman et al. |

FOREIGN PATENT DOCUMENTS

| | | | |
|---|---|---|---|
| DE | 4438511 A | | 9/1995 |
| EP | 0105706 A | | 4/1984 |
| EP | 1211525 A | | 6/2002 |
| JP | 04183477 | * | 6/1992 |
| JP | 04183477 A | | 6/1992 |
| JP | 10-239508 | * | 9/1998 |
| JP | 2004-87718 | | 3/2004 |
| WO | 9115793 | | 10/1991 |
| WO | 02/37160 A2 | | 5/2002 |
| WO | 2005/026813 A1 | | 3/2005 |

* cited by examiner

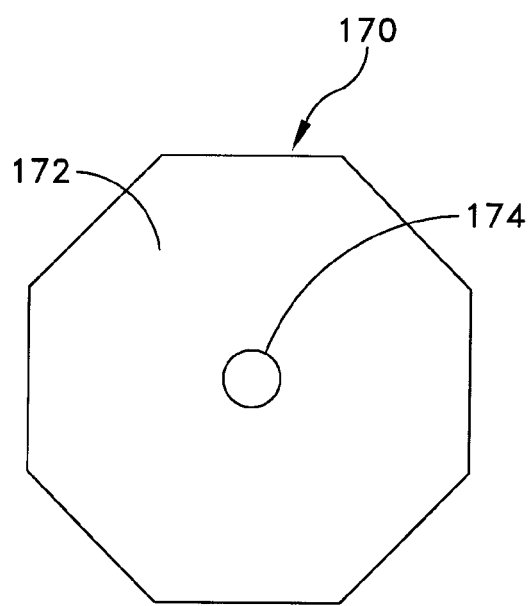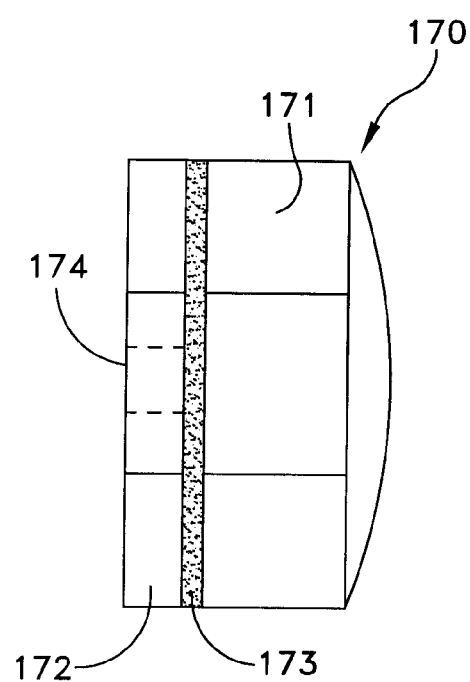
FIG. 16A
FIG. 16B

ACYLINDRICAL OPTICAL DEVICE

CROSS REFERENCE TO RELATED APPLICATION

This application is a continuation-in-part of U.S. patent application Ser. No. 10/659,727 filed Sep. 10, 2003 now U.S. Pat. No. 7,116,486 granted Oct. 3,2006 for Acylindrical Optical Devices and Method of Manufacture, which patent is assigned to the same assignee as this application.

BACKGROUND OF THE INVENTION

1. Field of the Invention

This invention generally relates to optical devices and methods for the manufacture of such optical devices and more particularly to optical devices with lens systems of a small diameter or cross section.

2. Description of Related Art

Endoscopes are examples of optical devices that utilize optical systems characterized by an assembly of a plurality of optical elements, such as lenses, that are serially disposed along an optical axis. In an endoscope, for example, a lens system comprising multiple lens elements at a distal end constitutes an objective; a lens system at the proximal end constitutes an eyepiece; and one or more groups of intermediate lens elements define one or more relay lens systems.

Endoscopes utilizing such systems generally have working channels and lumens. Some working channels are filled with fiber to enable an external light source to illuminate a field of view. Others allow a surgeon to move instruments along the length of the endoscope to perform some function at the distal end while simultaneously viewing the area being treated. Still other working channels allow a surgeon to dispense a therapeutic, diagnostic or other material at the distal end of the endoscope, again while simultaneously viewing the area being treated.

Endoscopes and other optical devices of this nature generally are formed with cylindrical lens elements extending along a centered optical axis. The lens elements generally have concave, planar or convex image forming surfaces that are transverse to the optical axis. Multiple lens elements may be adjoined in lens systems in order to achieve particular optical characteristics, all as known in the prior art. Such lens elements and lens systems are called centered, rotationally symmetrical lens elements and systems, respectively.

Medical personnel who use these optical devices now indicate a preference for optical devices that have smaller and smaller diameters or cross sections. In fact some optical devices are now produced with an outer diameter of 1 to 2 mm using traditional lens making methods. However products that achieve these goals are difficult and expensive to manufacture with traditional lens making methods.

Traditional lens making methods include grinding and polishing operations to produce approximately spherical or other shaped image forming surfaces at the entrance and exit faces that define the optical characteristics of that lens element. Then the lens element is rotated about its geometric axis that will generally lie on the optical axis. A geometric axis is defined as a straight line locus of the centers of curvature of the refracting surfaces. The outer lens boundary then can be made essentially circular, as by abrasive grinding, such that the result is essentially a right circular cylinder with imaging forming spherical end surfaces and a cylindrically centered axis, i.e., a centered, rotationally symmetrical lens element. Individual lens elements can then be adjoined along the coincident optical and geometric axes to form a lens system.

The ability to make smaller optical devices including those with lens systems that continue to exhibit centered rotationally symmetrical characteristics, becomes more difficult as the lens diameter reduces. First, the final diameter of the lens is controlled by the location of the grinding or edging tool with respect to the optical axis including any positional variation due to tolerances in the manufacturing equipment. In conventional lenses these tolerances do not constitute a significant portion of the overall lens diameter. However, to achieve an absolute tolerance as a constant percentage of very small diameters requires extreme accuracy and tools that operate with extremely close tolerances. Machines for providing such accuracies become increasingly expensive as tolerance requirements become more stringent.

Second, in these optical devices, a lens element generally has an axial length that is several times the diameter. At small diameters it becomes difficult to support the lens element so that its optical axis remains in a single position relative to a tool reference. Moreover, as the diameter decreases the lens element becomes, in effect, more brittle and thus extremely fragile. These factors lead to an increased potential for breakage during manufacture.

Thus about 1-2 mm tends to be a practical minimum diameter for any lens element manufactured by traditional lens manufacturing methods. Lens systems in most currently commercially available endoscopes have an outer diameter of approximately 1.7 mm or greater. Endoscopes with such readily available lens elements are too big to be used in many applications including (1) medical applications such as viewing fine vascular structure, (2) minimally invasive endoscopy such as neurological and neurosurgical applications and arthoscopy, ear, nose and throat (ENT) applications, (3) cardiac surgical applications, and (4) endoscope applications that can benefit from the use of stereoscopic endoscopes.

What is needed is a method for enabling the efficient manufacture of high quality lens elements and lens systems having cross sectional dimensions that can be as little as 1 mm or less.

SUMMARY

Therefore it is an object of this invention to provide a method of manufacturing lens systems having cross sectional dimensions that are less than 1 or 2 mm.

Another object of this invention is to provide a lens element with high centering accuracy and with cross sectional dimensions of less than approximately 1 mm.

Still another object of this invention is to provide a method for efficiently manufacturing a high quality lens or lens system from a conventional lens or lens system useful in optical devices with a reduced outer diameter to less than 1mm.

In accordance with one aspect of this invention, an optical device extends along an axis and comprises at least one lens element having polished image forming surfaces at each end thereof. At least three sawn planar surface faces extend between the image forming surfaces. Each sawn planar surface lies on a plane intersecting two planes coincident with the planes of adjacent sawn planar surfaces. As a result, the lens element has a polygonal cross-section.

In accordance with another aspect of this invention, an optical device includes a plurality of optical elements and a means for supporting the plurality of optical elements to form a lens system. At least one optical element comprises a lens element having a pair of spaced, polished image forming surfaces. At least three sawn planar surface faces extend between the image forming surfaces. Each sawn planar surface lies on a plane intersecting two planes coincident with the planes of adjacent sawn planar surfaces. Consequently, the lens element has a polygonal cross-section.

In accordance with another aspect of this invention, a plurality of final lens elements, each having polygonal cross-sections are formed from a plurality of initial lens elements in a supported array. The final lens elements are formed by sawing across the array thereby to remove portions of each of the initial lens elements and to form a plurality of sawn planar faces for each initial lens element. This produces an array of sawn lens elements, each having a polygonal cross-section. Final lens elements are produced by separating the sawn lens elements from the supported array.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

FIGS. 16A and 16B are plan views of an alternative embodiment of a final lens element constructed in accordance with this invention.

DESCRIPTION OF ILLUSTRATIVE EMBODIMENTS

Figure 1:
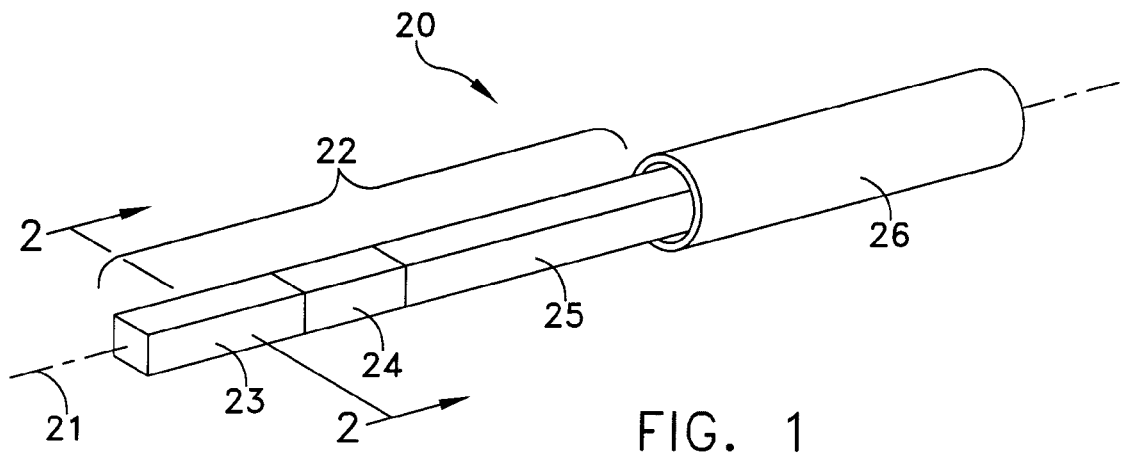
FIG. 1 is a perspective view of an optical device constructed in accordance with this invention.
Figure 2:
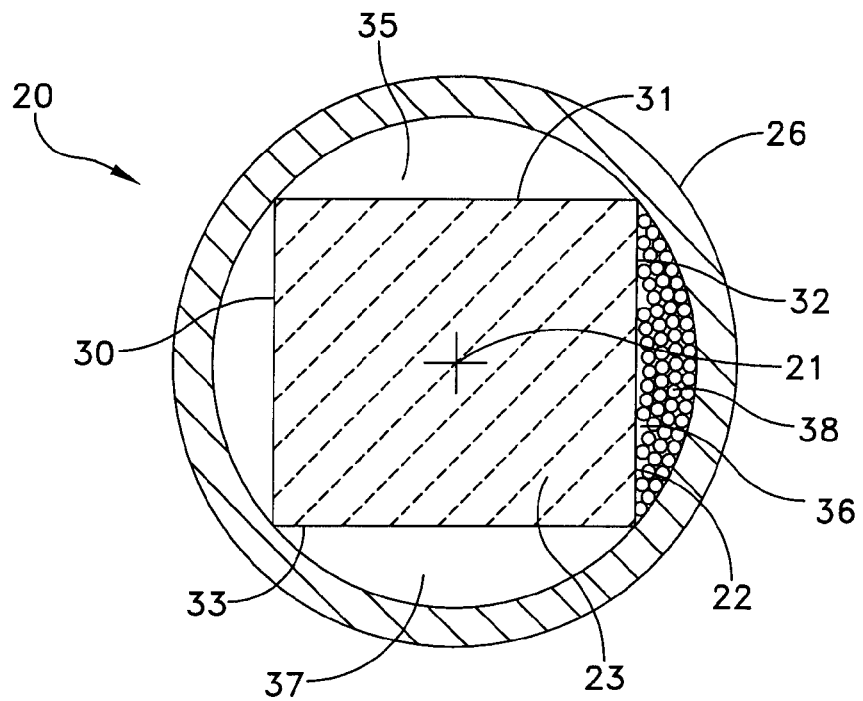
FIG. 2 is a cross-section of the optical device taken along lines 2-2 in FIG. 1.
Figure 3:
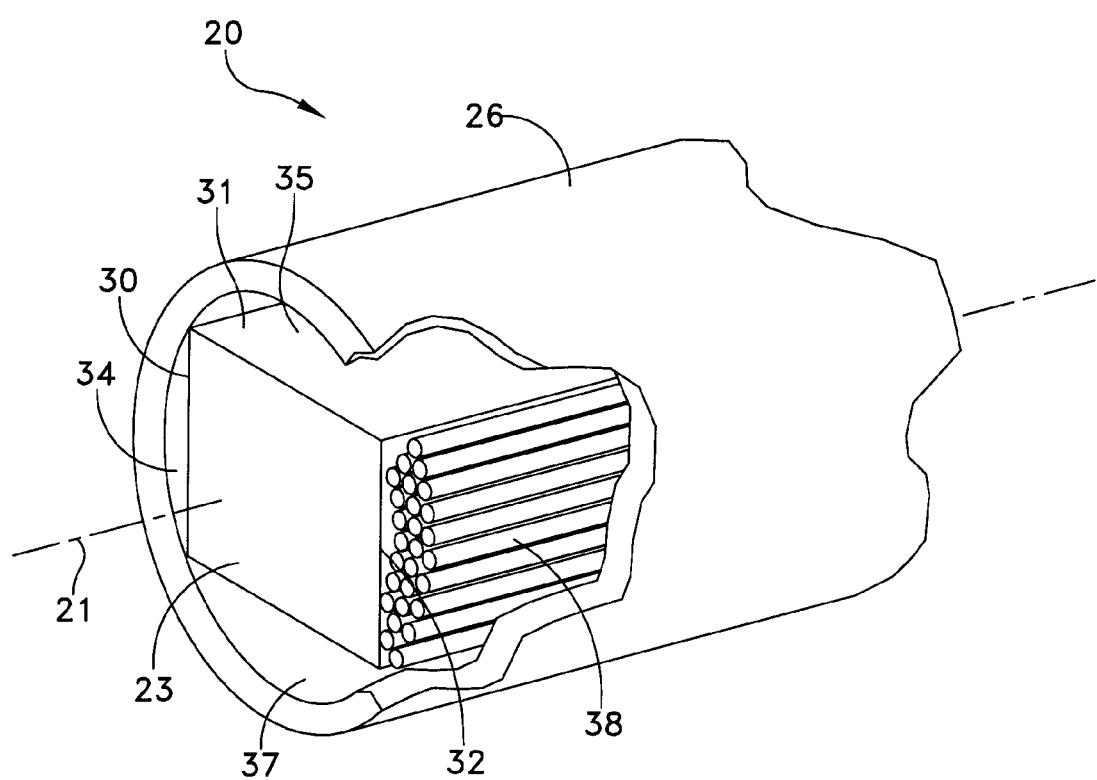
FIG. 3 is another perspective view to illustrate the construction of the optical device in FIGS. 1 and 2.

FIGS. 1 through 3 depict a portion of an optical device 20, such as an endoscope, constructed in accordance with this invention that lies along an axis 21. In this embodiment, the optical device 20 includes a lens system 22 with adjoined lens elements 23, 24 and 25. In this particular embodiment, each of the lens elements 23, 24 and 25 and the lens system 22 have centered rotational symmetry with respect to the axis 21 so the optical and geometric axes of the optical device are coincident. Although not shown, but as will be known to persons of ordinary skill in the art, the end surfaces of each lens element constitute image forming surfaces that are polished, generally spherical surfaces that produce an image of any object proximate the axis 21. As manufacture and use of lens elements with such surfaces are known, FIGS. 1 through 3 do not depict a specific spherical surface. A flat traverse surface is shown as a representation of an entire class of image forming surfaces.

A sheath 26 circumscribes the lens system 22 and defines an outer diameter $d_o$. Referring specifically to FIG. 2 and in accordance with this invention, the lens element 23, like the lens elements 24 and 25, has a polygonal shape in cross-section, in this particular embodiment a regular polygon cross-section and specifically a square cross-section. That is, in cross section the lens element 23, and all the other lens elements in the lens system 22, form a square bounded by four flat surfaces 30, 31, 32 and 33 that intersect at right angles and are equidistant from the axis 21. Moreover, in FIGS. 1 through 3 the axis 21 is representative of the optical axis and the geometric axis because these axes are coincident.

As the sheath 26 is circular and circumscribes the square lens element 23, each face forms a chord that, with the sheath 26 defines an axially extending working channel with a cross section in the form of a segment. Such working channels are called "segmental working channels" in the following description. In FIGS. 1 through 3 segmental working channel faces 30 through 33 define one boundary of each of segmental working channels 34, 35, 36 and 37, respectively. At least one of these segmental working channels, such as the segmental working channel 36, could be used to contain optical fibers 38 for transferring light from the proximal end of the optical device beyond the distal end to illuminate a field of view. The other segmental working channels could accommodate instruments or therapeutic or diagnostic material or both or other agents such as water and saline solution.

As will be apparent, one characteristic of this invention is that placing a lens system with a polygonal cross section in a circumscribing cylindrical sheath automatically produces the segmental working channels. It will also be apparent that the transverse cross sectional area of a segmental working channel increases as the number of faces decreases.

Optical devices such as shown in FIGS. 1 through 3 can have a wide range of diameters. Lens assemblies in accordance with this invention have been constructed with outer sheath diameters, $d_o$, of 1.2 mm. Optical devices with even smaller diameters are anticipated.

Figure 4:
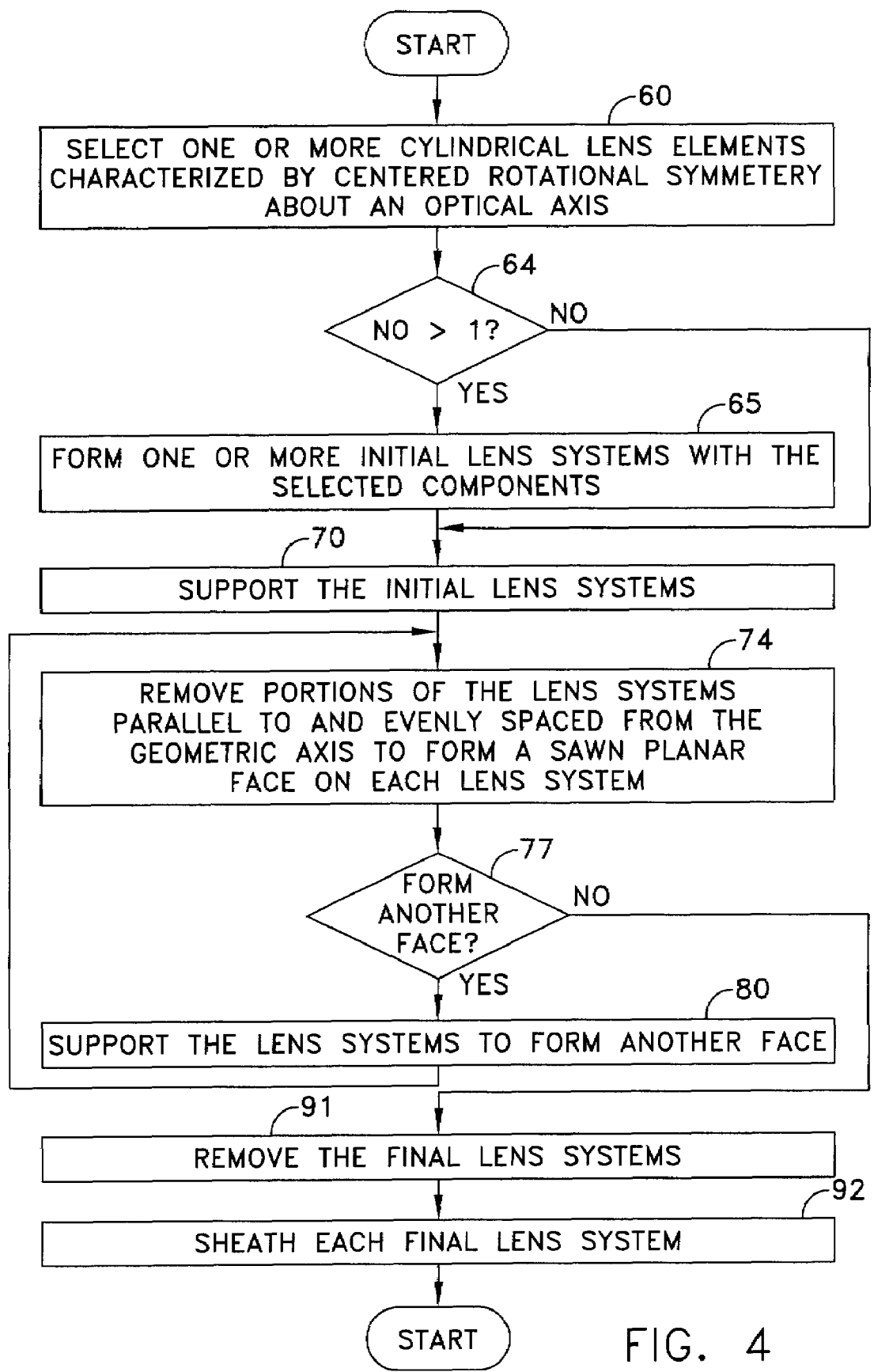
FIG. 4 is a chart that depicts major steps in the manufacturing process for obtaining the optical device shown in FIG. 1.
Figure 5A:
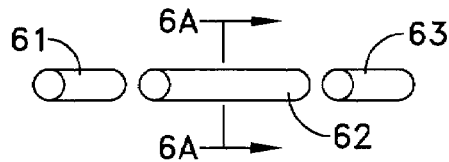
FIGS. 5A through 5I are illustrative of certain steps in the manufacturing process shown in FIG. 4.
Figure 6A:
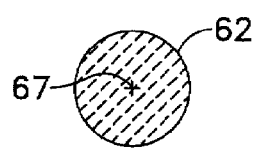
FIGS. 6A through 6I are illustrative of the appearance of an optical device at various stages during the manufacturing process of FIG. 4.

The method for making these lenses is described in FIGS. 4, 5A through 5I and 6A through 6I. This particular method is described with respect to manufacturing a final lens system or systems in which the geometric and optical axes are coincident and in which a cross section normal to the axes is a square. Step 60 in FIG. 4 represents the selection of one or more initial cylindrical lens elements characterized by having a centered rotational symmetry with coincident optical and geometric axes. If it is an objective to produce a three-piece initial lens assembly, process 60 represents the selection of optical elements 61, 62 and 63 as shown in FIG. 5A with the cross section shown in FIG. 6A. The diameter should be at least as large as the diameter of a circle that will circumscribe the final lens system. These lens elements will have different end faces forming convex, concave, planar or other image forming surfaces in order to achieve the desired optical characteristics as previously described.

Figure 5B:
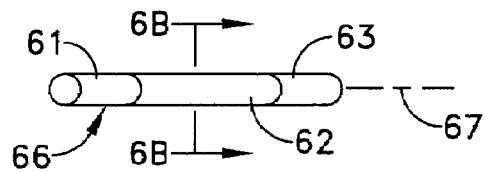
Figure 6B:
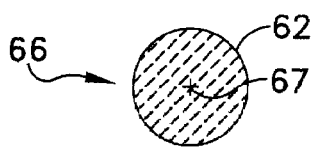

Referring to FIG. 4, if, as in this example, a decision is made at step 64 of FIG. 4 as to whether a final lens system will contain multiple lens elements like the lens system shown in FIG. 5B with the geometric axis of the final lens system (hereinafter the "final geometric axis") coincident with the optical axis 67. Step 65 in FIG. 4 sets up the formation of one or more initial lens assemblies. FIG. 5B shows a single initial lens assembly 66 formed by joining, typically by cementing, the initial lens elements 61 through 63 along an optical axis 67. A cross-section FIG. 6B depicts the initial lens system 66 with its circular cross section and one initial lens element 62 that is centered on the optical axis 67.

Figure 5C:
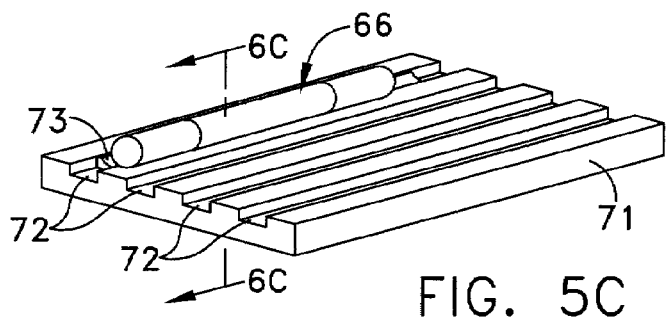

Once the initial lens assembly is formed, step 70 of FIG. 4 represents the procedure of providing a support for each initial lens assembly, such as the initial lens assembly 66. In accordance with one aspect of this invention, a tool 71 in FIG. 5C is formed with a plurality of parallel support slots 72. The slot width is selected to provide a stable support for an initial lens system. FIG. 5C shows the single initial lens system 66 for clarity. It also will become apparent that multiple initial lens systems may be positioned in each support slot. It will be apparent that these multiple initial lens systems can be spaced along a single slot and have different initial lens elements. Generally it is merely necessary to assure that all the lens systems in a single support slot should be selected so they will have the same finished cross section.

In one particular embodiment, the tool 71 is formed of a float glass plate and the support slots 72 are formed by a dicing saw. Dicing saws are regularly used in the semiconductor industry and are constructed to have cutting tolerances consistent with an indexing accuracy cumulative error of 0.001 mm per 160 mm traversal or less.

Figure 6C:
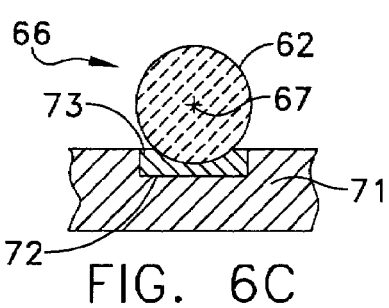

As shown in FIGS. 5C and 6C, a thermoplastic cement 73 fills the support slots, like the support slot 72 to capture each initial lens assembly, such as the initial lens system 66, in the tool 71. The initial lens system 66, particularly the initial lens element 62, now lies in the support slot 72 filled with the thermoplastic cement 73 and is rigidly fixed. This process positions the initial lens systems accurately for subsequent processing.

Figure 6D:
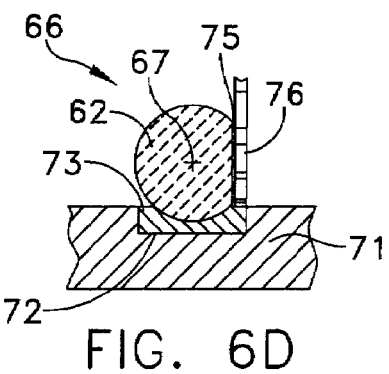

Step 74 in FIG. 4 represents a process by which a portion of the initial lens system 66 is removed to form a sawn planar face 75 of FIG. 6D that is equally spaced from the desired final geometric axis that in this specific example is coincident with the optical axis 67. In accordance with one aspect of this invention, the distance to the final geometric axis measured perpendicular to a face, such as the sawn face 75 of FIG. 6D is $(d_f/2)\sin 45°$ where $d_f$ represents the desired finished size of the lens system measured diagonally between opposite corners. As will be apparent, this distance is one-half of the width of a face.

Figure 5D:
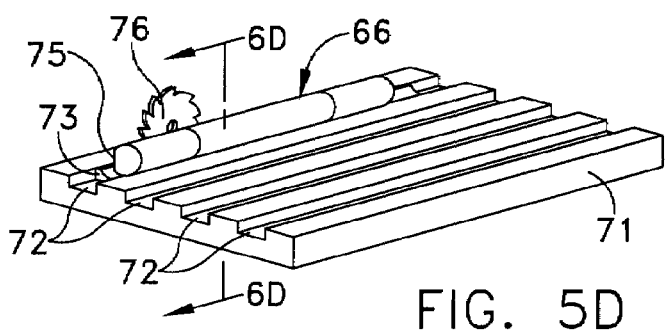

As shown in FIGS. 5D and 6D, a dicing saw 76, positioned to form a vertical cut relative to the tool 71, removes material from the lens assembly to define the sawn face 75 at some predetermined distance from the axis 67. Commercially available dicing saws make such a cut so that the face 75 is at a fixed distance from the optical axis 67 with an accuracy of 0.001 mm per 160 mm of traversal or less.

If a decision were made to produce a lens with a single sawn face, step 77 would terminate further processing steps. Consequently the final lens system would have a single sawn surface as shown in FIG. 6D.

Figure 5E:
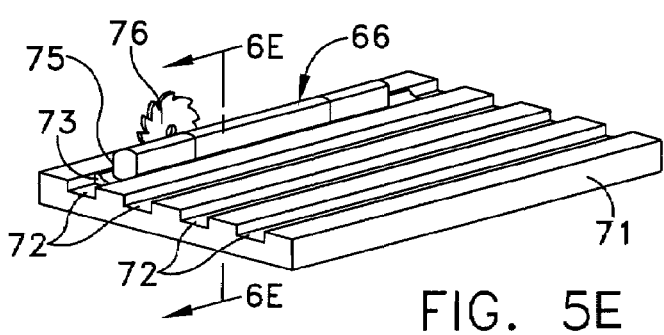
Figure 6E:
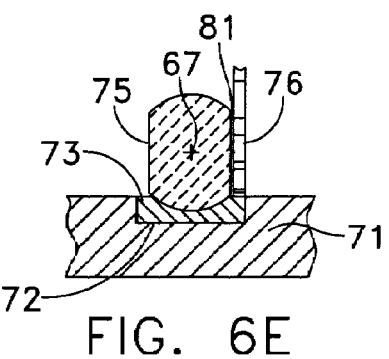

However, in most applications of this invention it is desired to have a final lens system with multiple sawn surfaces so assuming a decision has been made to form such additional faces, step 77 of FIG. 4 transfers control to step 80 that represents a procedure for properly supporting the lens systems for forming another sawn face. To produce a final lens system with a square cross section in a plane normal to the final geometric axis 67, step 80 requires that the tool 71 be rotated 180° and realigned. As shown in FIGS. 5E and 6E the dicing saw 76 is positioned. It saws a face 81 that is parallel to the face 75 and equidistant from the geometric axis.

Figure 5F:
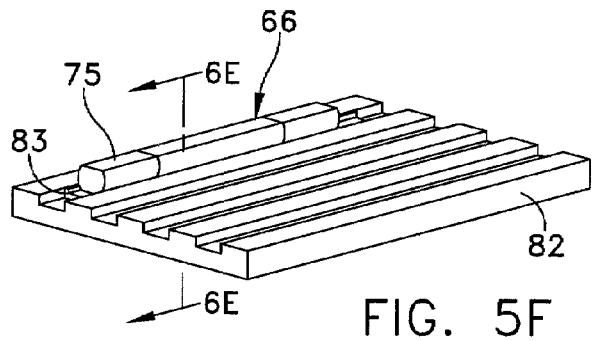
Figure 6F:
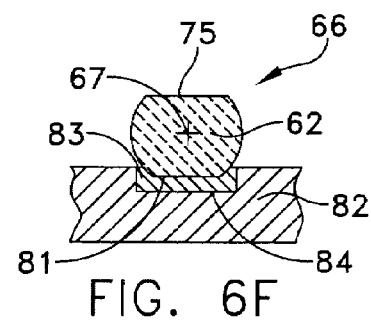

If additional surfaces are to be formed, step 80 in FIG. 4 needs to rotate the lens systems by 90°, such as by removing them from the tool 71 and placing them in another tool 82 having wider support slots 83 as shown in FIGS. 5F and 6F. A thermosetting material 84 then fills the support slots 83 to capture the lens system 66. Now the faces 75 and 81 are horizontal and in FIGS. 5F and 6F the face 75 is above the face 81. The lens system 66 obviously could be reversed such that the face 75 was in contact with the tool 82.

Figure 5G:
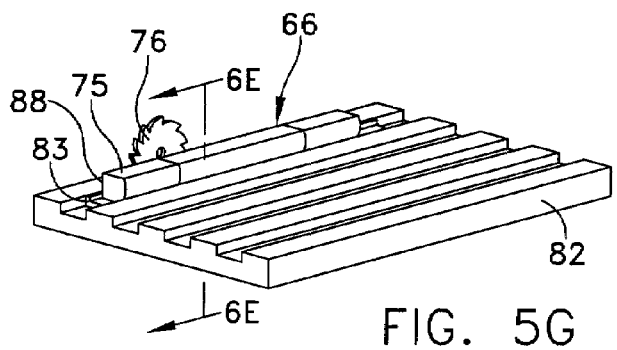
Figure 6G:
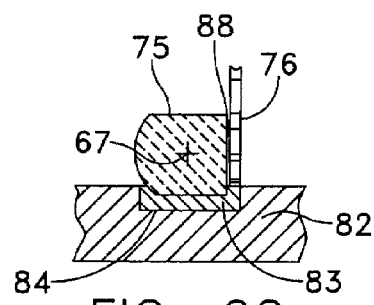
Figure 5H:
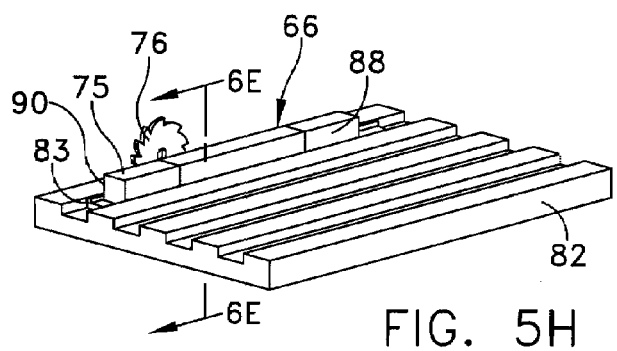
Figure 6H:
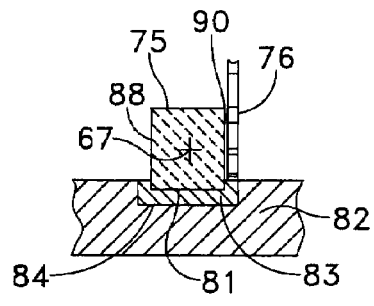

Steps 77 and 80 in FIG. 4 represent the procedures by which the lens systems are sawn in succession. In a cut as shown in FIGS. 5G and 6G, the dicing saw produces a third sawn face 88 that is perpendicular to the sawn faces 75 and 81 and that is equidistant from the geometric axis 67. Then the tool 82 can be rotated 180° and aligned as shown in FIGS. 5H and 6H, so the dicing saw produces a fourth sawn face 90 parallel to the third sawn face 88, perpendicular to the sawn faces 75 and 81 and equidistant from the geometric axis 67.

Figure 5I:
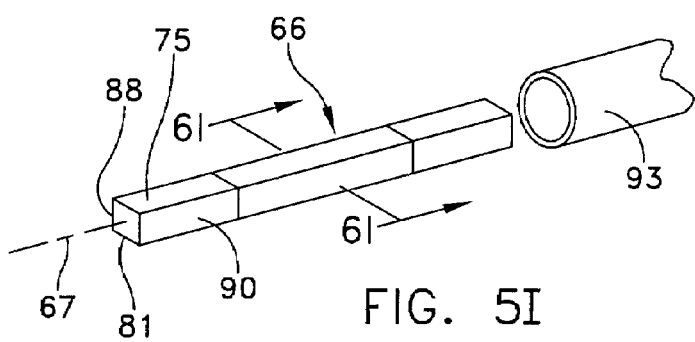
Figure 6I:
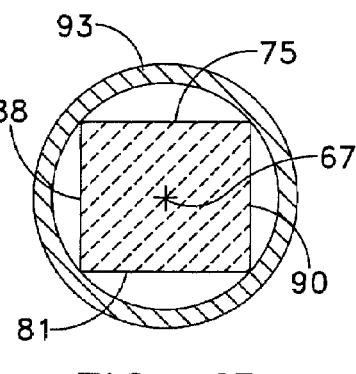

When this processing has been completed, step 91 in FIG. 4 represents the step of removing each final lens system from the tool 82. Step 92 represents the procedure of supporting the final lens systems in a sheath 93 as shown in FIGS. 5I and 6I to complete the optical device.

As will now be apparent, the procedures and controls of FIG. 4 merely provide a work path organization to depict the various major processes to produce lens elements and systems in accordance with this invention. It will also be apparent that this method of manufacture by successive sawing of an initial lens system produces a final lens system that has a very small diameter or cross section without the need for expensive grinding or other operations. This procedure allows a manufacturer to use large conventional, economical lens elements as a foundation for the very small lens assembles. With each sawing operation the lens assembly becomes smaller. However, sawing allows the lens assembly to be fully supported during all the operations. This compensates for any breakage due to an increasing brittle nature of the lens assembly as manufacture proceeds. Generally the controls of steps 60, 65, 70, 74, 80, 91 and 92 and decisions 64 and 77 all operate to produce a lens system having a plurality of axially extending flat sawn faces that lie in intersecting planes.

This process has been used successfully to manufacture centered, point symmetric lenses circumscribed by a sheath having an inner diameter of 0.6 mm and an outer diameter of 0.85 mm. Optical devices with such reduced diameter or even smaller diameters will be useful in a large number of applications heretofore unavailable for endoscopic diagnosis and therapy.

Figure 7A:
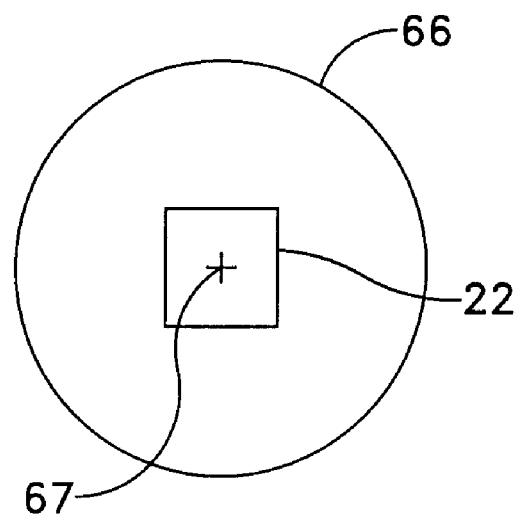
FIGS. 7A through 7C are useful in understanding variations of the method and construction depicted in FIGS. 1 through 6I.
Figure 7B:
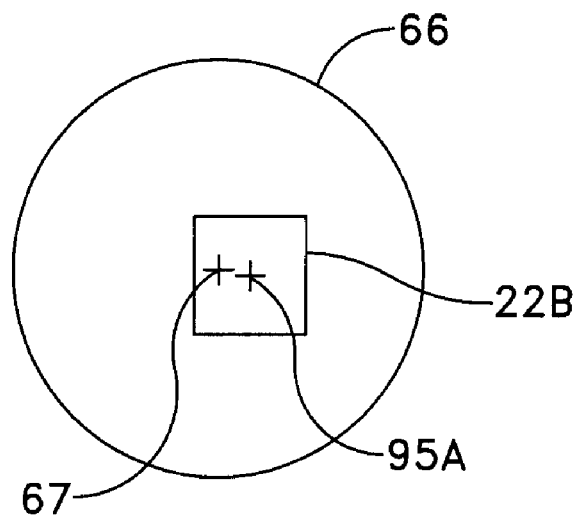

This invention has been described in terms of one specific embodiment in which each of the lens elements selected for the lens assemblies are characterized by centered, rotational symmetry about coincident optical and geometric axes and in which the final lens system exhibits point symmetry about coincident geometric and optical axes. FIG. 7A schematically depicts such a configuration in which optical axis 67 is coincident with the geometric axis of the initial lens assembly 66 and the final lens assembly 22. FIG. 7B depicts a variation in which the optical and geometric axis 67 of the lens assembly 66 are parallel but spaced. Processing according to FIG. 4 is modified so that the support of the lens systems positions them to produce sawn planar faces at predetermined positions from a geometric axis 95A that is offset from the optical axis 67. In this specific embodiment, the boundary of the resulting final lens system 22B includes the optical axis 67. Such an approach would be useful for producing lens systems characterized by having an eccentric pupil.

Figure 7C:
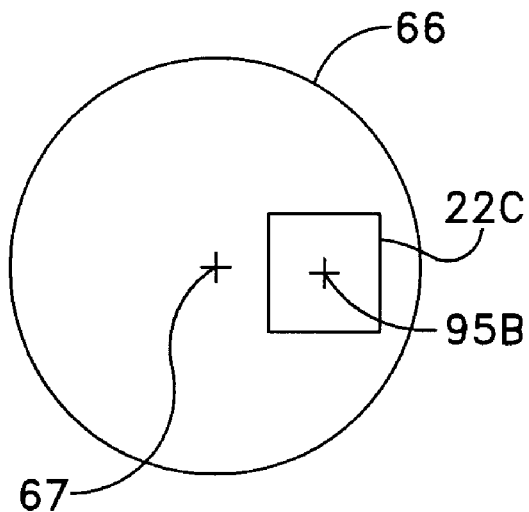

Similarly FIG. 7C depicts a final lens system 22C with a geometric axis 95B offset from the optical axis 67. In this embodiment the optical axis 67 lies outside the boundaries of the final lens system 22C. Such an approach would be useful for producing lens systems with unobstructive apertures ("eccentric pupil" systems) such as a confocal reflective microscope, a Schwarzchild arrangement microscopic or telescopic system.

Each of the foregoing embodiments is characterized by a geometric axis that is coincident with or parallel to the optical axis of an initial lens assembly. To achieve still other optical properties, the sawing operation might also be controlled to produce sawn faces parallel to a geometric axis that is oblique to the optical axis.

Figure 8:
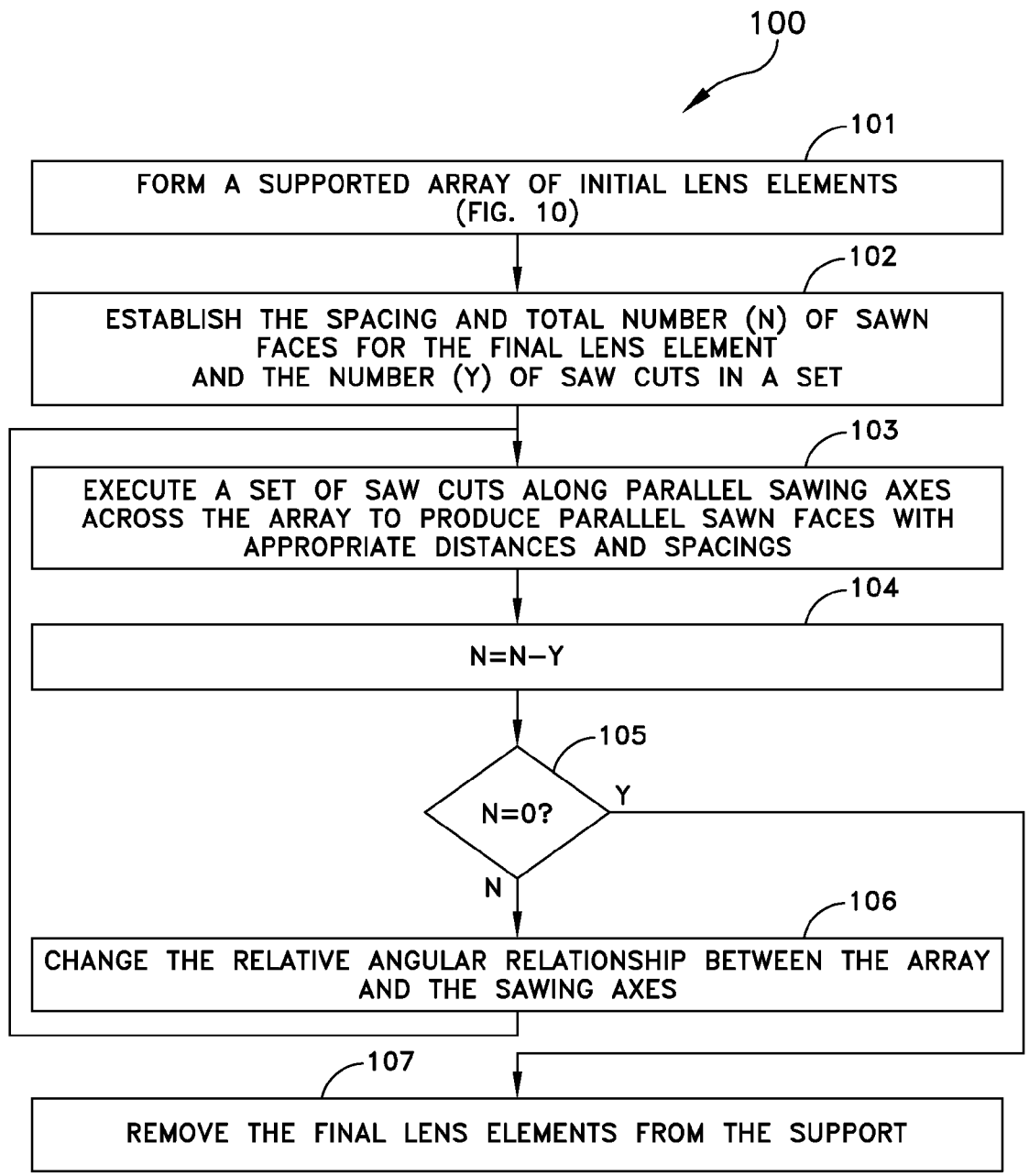
FIG. 8 is a chart that depicts major steps in an alternative manufacturing process for obtaining optical devices.

It is also possible to form lens elements having polished image forming surfaces at each end thereof and at least three sawn planar faces extending between the image forming surfaces in which the lens elements are formed in a more efficient manufacturing operation. FIG. 8 schematically depicts a process 100, including steps 101 through 107, for forming such multiple final lens elements.

Figure 9A:
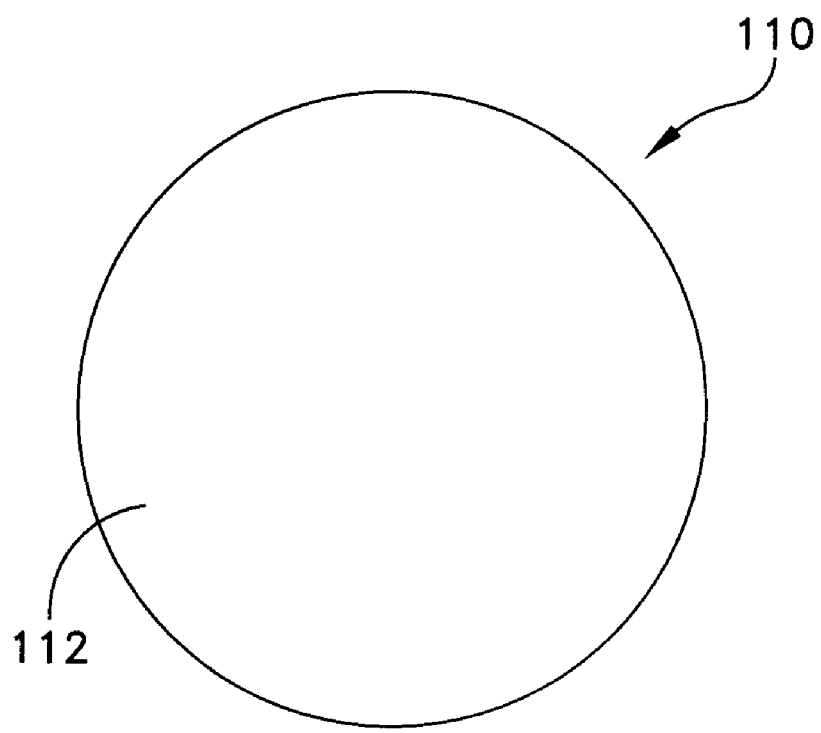
FIGS. 9A and 9B are plan views of a lens element useful in the process of FIG. 8.
Figure 9B:
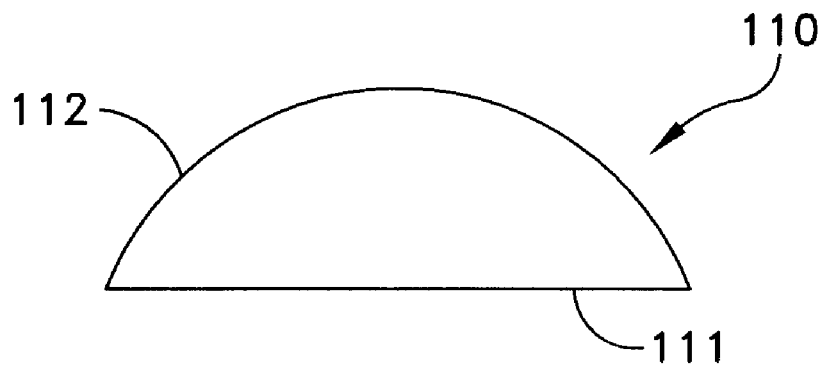
Figure 10:
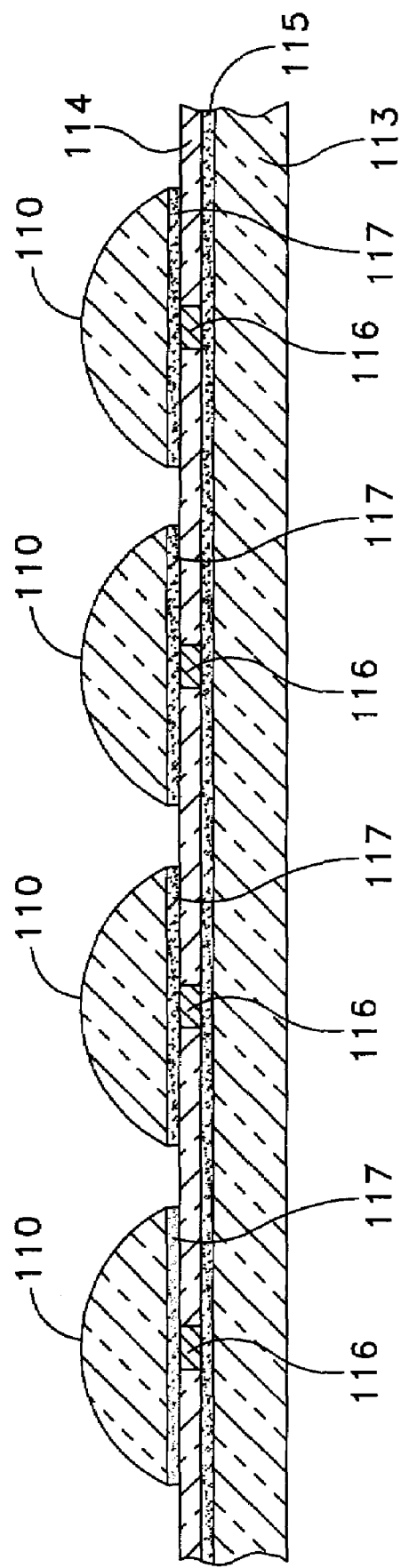
FIG. 10 depicts an array of lens elements that is useful in the process of FIG. 8.

Step 101 represents the step of forming a supported array of initial lens elements. There are several processes for forming such a supported array. In one approach conventional grinding and polishing operations form a lens element, such as a plano-concave lens 110 shown in FIGS. 9A and 9B having a planar imaging forming surface 111 and a convex imaging forming surface 112. In this specific example and as shown in FIG. 10, a support 113 and an aperture plate 114 are bonded together with an appropriate adhesive 115 as known in the art. The aperture plate has a plurality of equally spaced apertures 116 for defining a position for each lens element 110 in the array. That is, each lens element 110 will be located so its geometric axis is aligned with an aperture 116. A transparent optical adhesive 117 coextensive with the planar image forming surface 111 of each of the initial lens elements 110 bonds each lens element 110 to the aperture plate 114 in the supported array.

Other procedures could be used to complete the function of step 101. For example, the individual lens elements 110 in FIGS. 9A, 9B and 10 could be replaced with an integral lens array. Such an array could be bonded to an aperture plate with properly positioned apertures, like the aperture plate 114 in FIG. 10. Alternatively, the array could be bonded directly to a support, like the support 113 in FIG. 10 or be formed to a self-supporting array. By whatever process, step 101 produces an array of initial lens elements having polished image forming surfaces at two ends thereof.

Referring again to FIG. 8, step 102 establishes the spacing and a total number "N" of sawn faces for the final lens element. "Y" indicates the total number of saw cuts that will occur during a single set. For example, if the final lens element is to have an even number of sawn faces that produce a regular polygonal cross section, Y=2. Specifically, if the lens elements shown in FIG. 10 are to be formed into final lens elements having regular octagonal cross sections, N=8 and Y=2. If the final lens element is to have a triangular cross section, N=3 and Y=1. If the final lens element is to have a non-regular hexagonal cross section, N=6 and Y=1.

Referring now to step 103 in FIG. 8 and assuming (1) each final lens element is to be taken from one of the initial lens elements 110 and (2) each final lens element is to have the cross section of a regular octagon, the method of FIG. 8 and related apparatus produces four sets of parallel saw cuts through the initial lens elements 110 in sequence with a depth set to penetrate some or all of the aperture plate 114. As known in the dicing saw art, the depth of a saw cut will be determined, usually empirically, in view of the required cut depth and the cutting blade stability characteristics.

Figure 11:
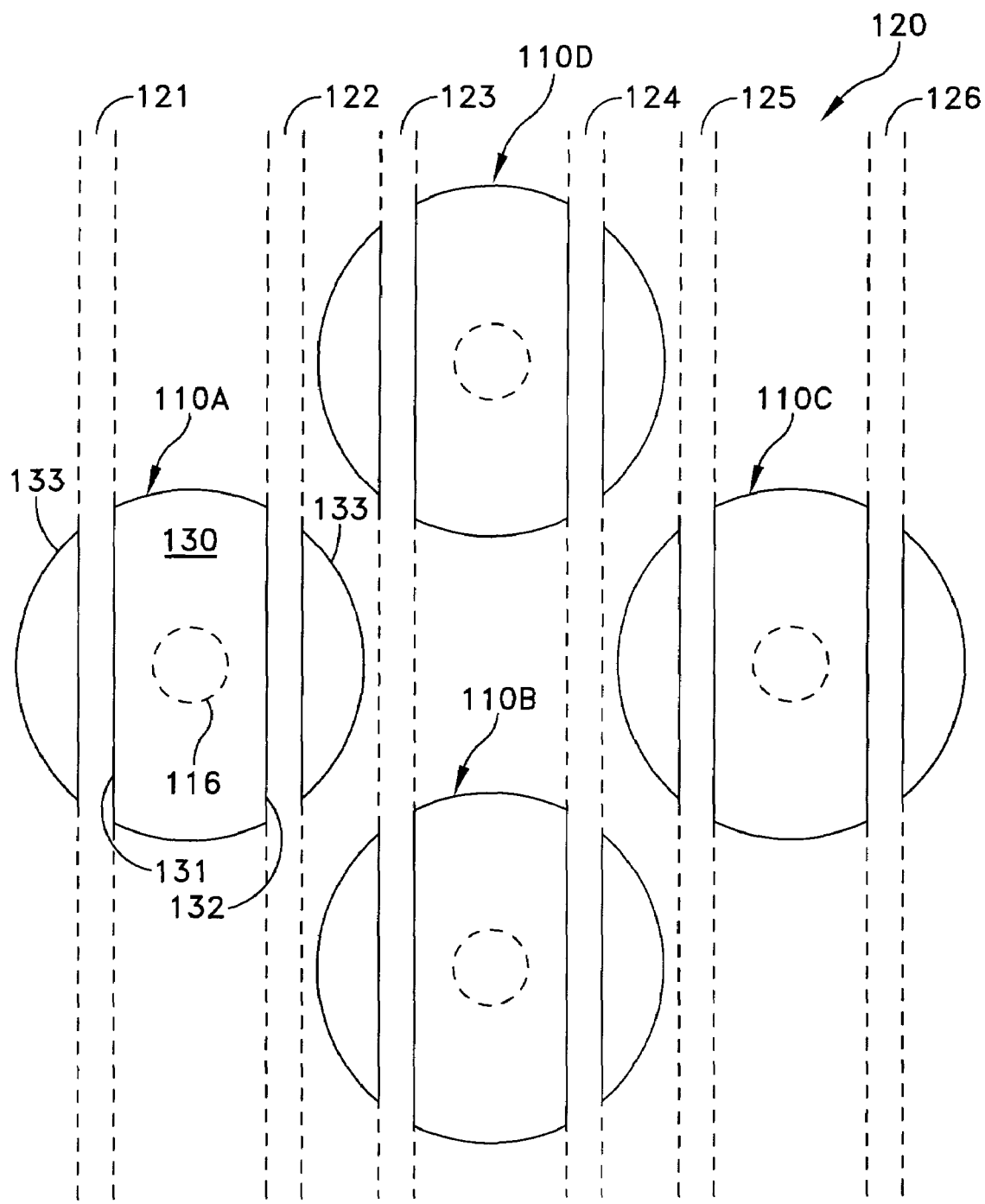
FIGS. 11 through 14 depict the effects of sawing operations that occur in accordance with the process of FIG. 8.

More specifically, FIG. 11 depicts a first set of saw cuts 121 through 126 for four initial lens elements 110A through 110D arranged in an array. Steps 103 through 106 in FIG. 8 define a loop by which all the initial lens elements are sawn. During a first iteration of the loop, step 103 in FIG. 8 separates each of the lens elements 110A through 110D in FIG. 11 into an oblong center structure 130 having final sawn faces 131 and 132. In this embodiment the final sawn faces 131 and 132 are parallel and equidistant from the center of the intermediate lens structure 130. Portions across the saw cuts, such as saw cuts 121 and 122, constitute residual sections 133.

Referring again to FIG. 8, after the process of step 103 is complete, a determination is made if additional saw cuts are required according to N=N−Y. As previously described, for a lens element to have a regular octagonal cross section, initially N=8 and Y=2. So step 104 calculates a new value for N, i.e., N=N−Y=6. Therefore step 105 transfers control to step 106 to allow a change in the relative angular relationship between the array and the sawing axes. In the particular embodiment this change occurs by rotating the array by 90°.

Figure 12:
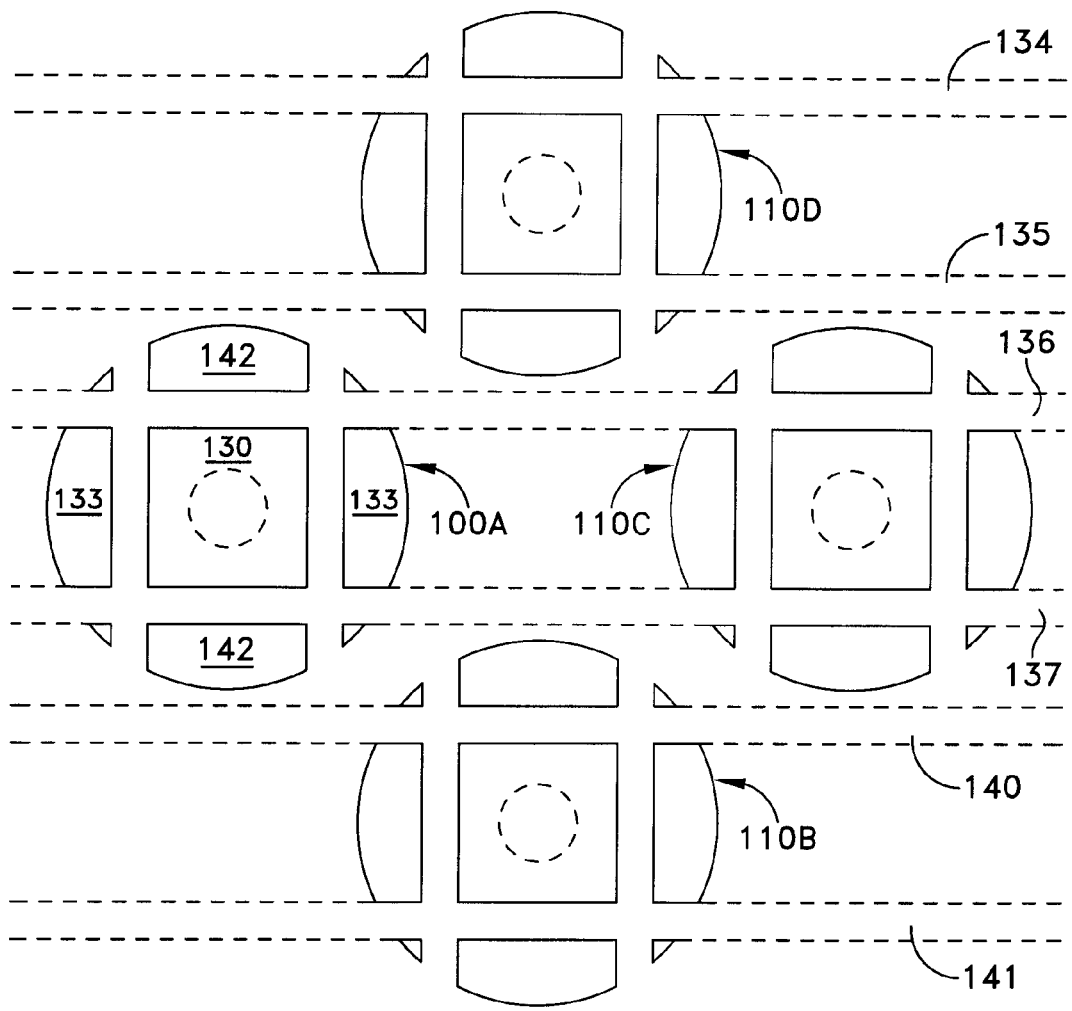

Step 103 then produces another set of parallel saw cuts. More specifically as shown in FIG. 12, the 90° shift produces saw cuts 134 through 137, 140 and 141 across the array as it existed after the saw cuts shown in FIG. 11. After the saw cuts of FIG. 12 have been completed, the center portion or modified intermediate lens element 130 has a square cross section. The prior residual portions 133 are cut and the ends of the portion 130 in FIG. 11 external to the saw cuts of FIG. 12 are shown as new residual portions 142.

Figure 13:
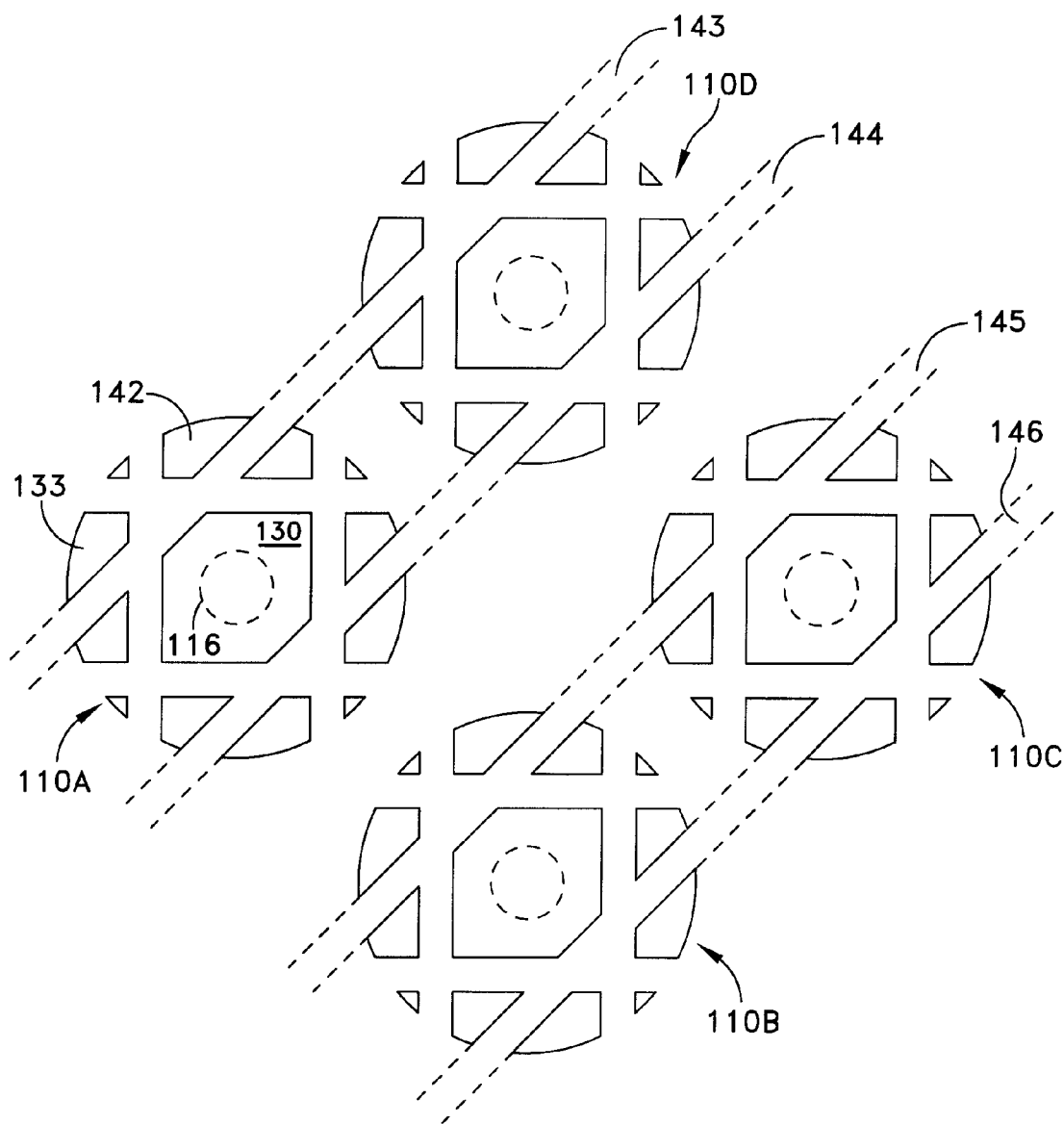

Referring again to FIG. 8, step 104 calculates N=N−Y, so N=4 and step 105 again maintains the loop. Step 106 changes the relative angular relationship of the array. FIG. 13 particularly depicts the process of rotating the array by 45° after which a series of four saw cuts 143 through 146 are made in accordance with the process of step 103 in FIG. 8. Now the central portion 130 has six sides and the sections 133 and 142 have been further divided into smaller residual portions.

Figure 14:
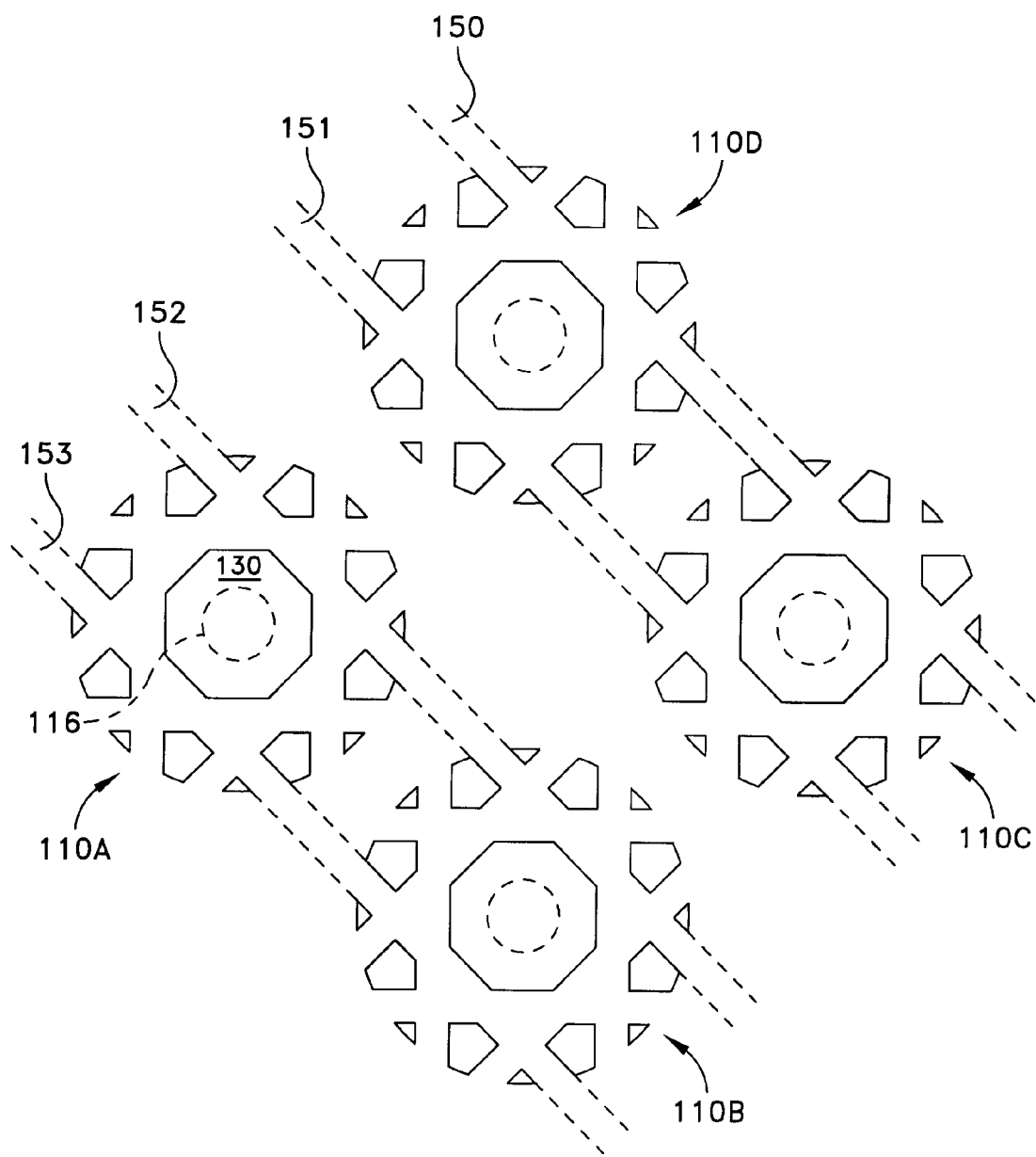

When the operation in FIG. 13 is complete, step 104 calculates N=N−Y so N=2 and step 105 again transfers control to step 106. Now the relative angular relationship is changed by rotating the array through 90° so that step 103 produces saw cuts 150 through 153 shown in FIG. 14. During this iteration steps 104 and 105 produce a value N=0, so the sawing operations are completed and have produced a cross section for the lens element 130 that is a regular octagon. Portions of the glass outside the sawn cuts form residual portions.

Step 107 separates the final lens elements 130 from the supported array. That is, in this embodiment step 107 separates the final lens elements 130 from the support 113 and/or aperture plate 114 of FIG. 10. The particular separation process will depend on the specific structure of the array, the supporting structure and the final lens element design. Assume, for example, that the final design requires only the lens elements 130 without any additional elements. If the lens elements are mounted as shown in FIG. 10, the adhesives are selected so that a solvent dissolves the adhesives 115. If the lens elements were originally bonded to a support, like the support 113, the solvent dissolves the bonding adhesive. With any of these approaches, the process produces a plurality of lens elements, each of which has the structure of the lens element 160 shown in FIGS. 15A and 15B.

Figures 15A, 15B:
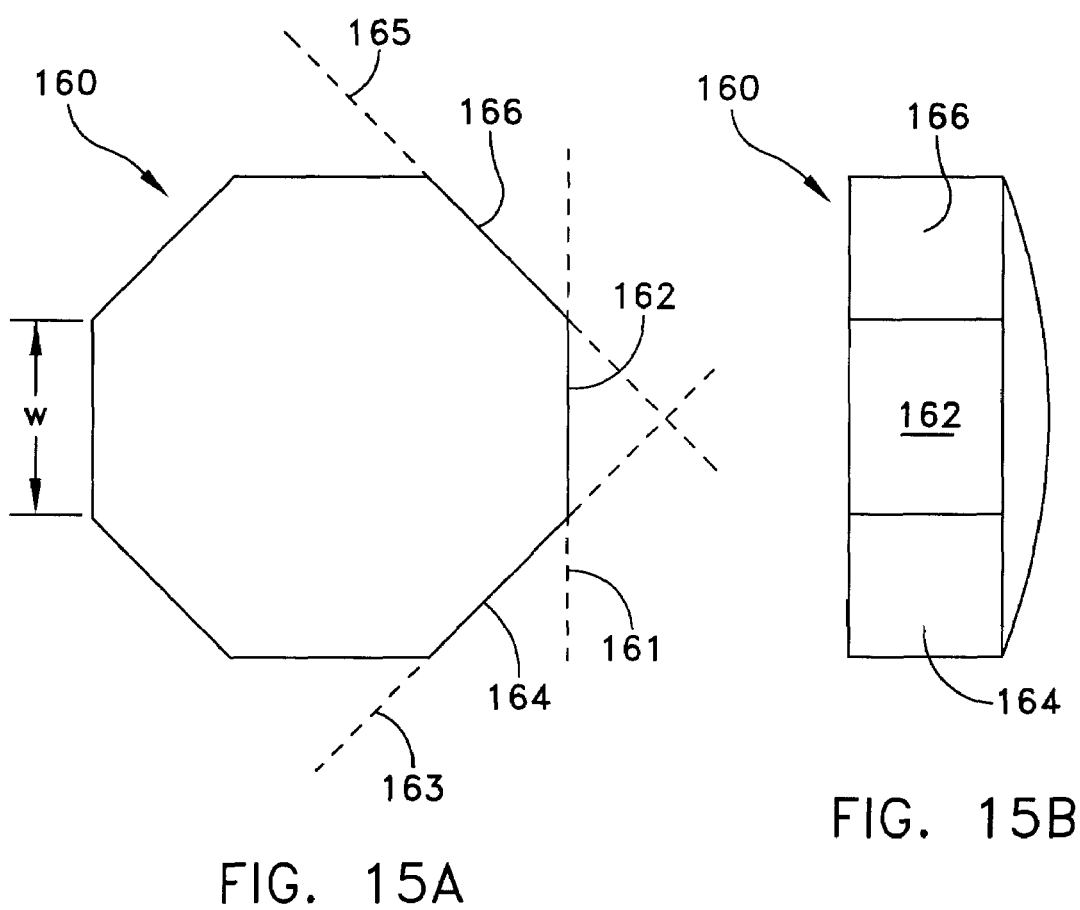
FIGS. 15A and 15B are plan views of one embodiment of a final lens element produced by the process of FIG. 8.

As shown in FIGS. 15A and 15B, the lens element 160 is a regular polygon, namely a regular octagon. More specifically, the lens element 160 has a plurality of sawn planar surfaces. FIG. 15A depicts a line 161 that lies on the plane of the sawn surface 162; a line 163, on the plane of the sawn surface 164; and a line 165, on the plane of the sawn surface 166. Portions of each of the lines 161, 163 and 165 that are coextensive with their respective sawn surfaces intersect only the line portions associated with the adjacent sawn surfaces. For example, the portion of the line 161 only intersects the portions of the lines 163 and 165. Thus, as shown in FIG. 15A, the lens element 160 satisfies the mathematical definition of a polygon. In addition, each face has a width dimension "w" in the cross section of FIG. 15A along each sawn face. For a regular polygon, all sawn faces will have the same width dimension.

During manufacture a lens element, such as the lens element 160, may be chamfered, be produced with other irregularities at one or more of the vertices or be characterized by other structural, optically insignificant variations due to the vagaries of the manufacturing process or the desired final design of the lens. To the extent such a lens does not meet the mathematical definition of a polygon, it remains "polygonal." In this disclosure "polygonal" is intended to cover all such lens element cross sections. Similarly, "octagonal" is used to describe the cross section of any lens element that is an octagon or has the general shape of an octagon.

If the final design requires each lens element 130 and corresponding portions of the aperture plate 114, the adhesives are selected so that a solvent dissolves the adhesive 115, but not the optical adhesive 117. FIGS. 16A and 16B depict a resulting lens element 170. Specifically, the lens element 170 includes an octagonal plano-convex lens 171, like the lens 160 in FIGS. 15A and 15B, that is attached to a portion 172 of an aperture plate, such as the aperture plate 114 in FIG. 10, by an intermediate portion 173 of the optical adhesive 117 shown in FIG. 10. The aperture plate portion 172 incorporates an aperture 174 that aligns with the optical axis of the lens element 171.

Thus, it will be seen that a variety of separation and recovery processes can be used. In whatever way, step 107 provides the plurality of final lens elements having sawn surfaces and regular or irregular polygonal cross sections.

The process of FIGS. 10 through 14 is particularly adapted for "short" or "stubby" lens elements. Longer lens elements may be subject to bending or other forces that deflect the lens element during manufacture. Such deflections could produce non-planar sawn faces or even cause the lens element to fracture. However, for such longer lens elements filling the individual saw cuts with a dissolvable adhesive or other material that is readily removed from the final lens element can overcome this problem. For example, after the saw cuts 121 through 126 are made in FIG. 11, those saw cuts are filled with such a material so that the entire structure remains rigid and the lens elements 130 are fully supported. Similarly, after the saw cuts 134 through 141 are made in FIG. 12 those saw cuts are also filled. This is repeated after the saw cuts made in FIG. 13. As a result, any susceptibility to deflection or fracture can be resisted. An analogous process could be used with a self supported array for the manufacture of stubby lens elements. Therefore it will be apparent that the process of FIG. 8 is adapted to incorporate variations that enable the process to produce lens elements having all the features of invention.

Figure 17:
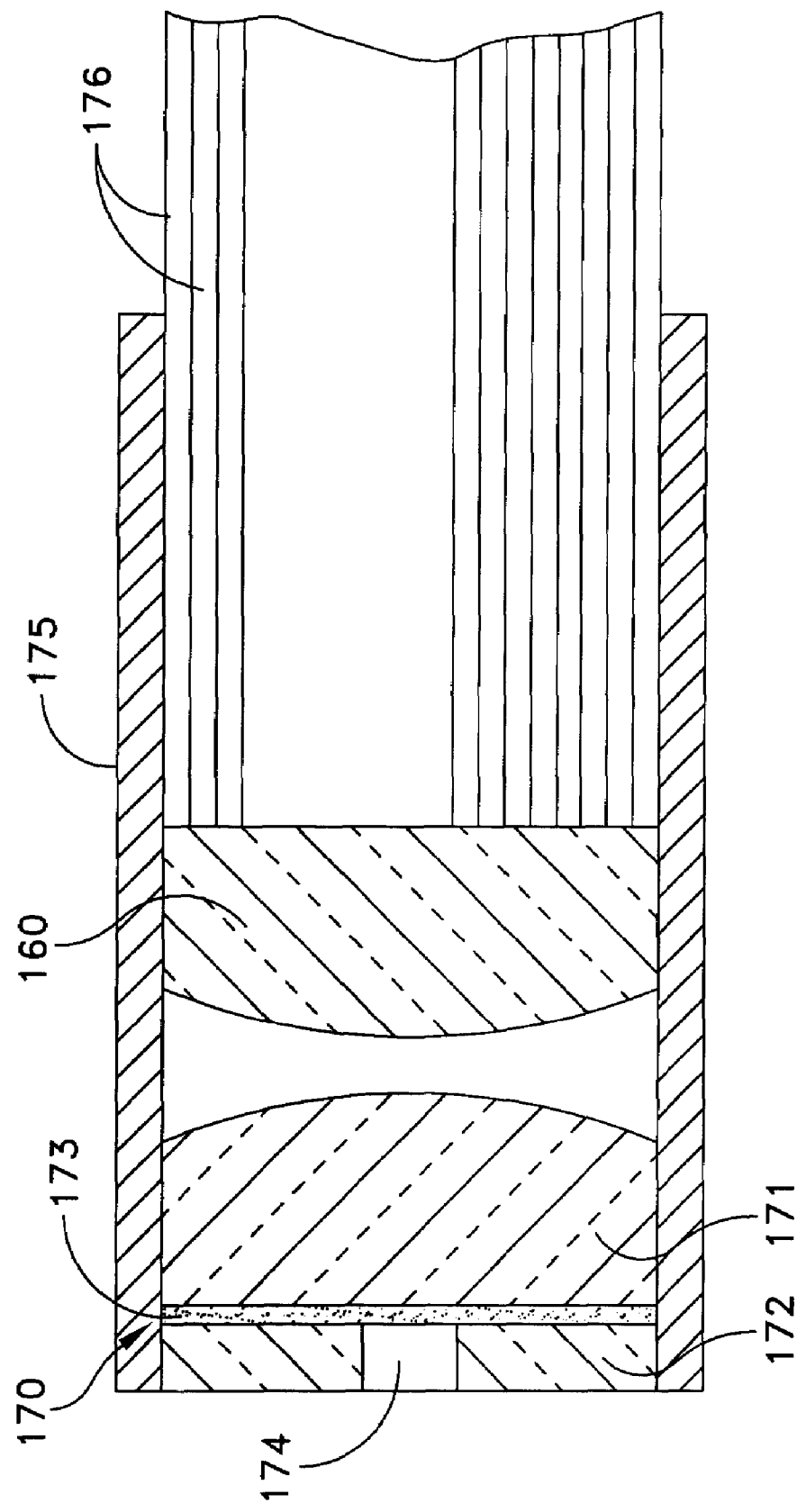
FIG. 17 is a cross-section of an optical device incorporating final lens elements as shown in FIGS. 15A, 15B, 16A and 16B.

FIG. 17 depicts a well known optical configuration for transferring an image from an object, not shown, to optical fibers. This specific configuration utilizes an octagonal lens element 160 of FIGS. 15A and 15B arranged as a convex-plano lens and an octagonal lens element 170 of FIGS. 16A and 16B arranged as a plano-convex lens with the aperture plate portion 172 and aperture 174 and the intermediate optical adhesive 173. A sheath 175 carries the lens elements with the planar image forming surface of the lens element 160 facing a plurality of optical fibers 176. The lens element 170 is positioned in the sheath 175 distally of the lens element 160 and spaced therefrom according to the optical characteristics for the optical device, as known in the art. In an alternate configuration, the convex surfaces of the lens elements 160 and 170 make contact. In this configuration the aperture 174 in the aperture plate portion 172 and the lens elements 160 and 170 focus the image on the ends of the optical fibers 176, as for example, in a flexible endoscope, for transfer to a viewing station.

This process, as depicted in FIGS. 8 through 14, enables the efficient manufacture of high quality lens elements and optical devices. Lens elements as shown in FIGS. 15A through 16B have been produced efficiently with a corner-to-corner dimension of about 0.75 mm and an overall length of about 0.60 mm. or less.

This invention has been described in terms of initial and final lens assemblies. Multiple lens assemblies can also be produced with each having different structures. Those different lens assemblies could form lens subassemblies such as objectives, eyepieces and relay lens assemblies for use in endoscopes with each optical device being held in a single sheath or individual sheath assemblies being positioned in an outer sheath. It will also become apparent that other sawing or equivalent techniques may be used or may come into existence that will provide even better tolerances than are currently available to enable the construction of even smaller lenses and numerous lens geometries and sizes. Still many other modifications can be made to the disclosed apparatus without departing from the invention. Therefore, it is the intent of the appended claims to cover all such variations and modifications as come within the true spirit and scope of this invention.

What is claimed as new and desired to be secured by Letters Patent of the United States is:

1. An optical device extending along an axis comprising:
   A) at least one lens element having smooth polished image forming surfaces at each end thereof and transverse to the axis, and
   B) at least three sawn planar faces extending between said image forming surfaces parallel to the axis, each sawn planar surface lying on a plane intersecting two planes coincident with the planes of adjacent sawn planar surfaces whereby said lens element has a polygonal cross section normal to the axis.

2. An optical device as recited in claim 1 additionally comprising means for supporting said lens element.

3. An optical device as recited in claim 1 having eight sawn planar surfaces whereby said lens element has an octagonal cross section.

4. An optical device as recited in claim 3 wherein each of said sawn planar faces has an equal width whereby said lens element has the cross section of a regular octagon.

5. An optical device comprising:
   A) a plurality of optical elements wherein at least one optical element comprises:
      i) a lens element having a pair of smooth spaced polished image forming surfaces spaced along a lens axis and transverse thereto, and
      ii) at least three sawn planar faces extending between said image forming surfaces parallel to the lens axis, each sawn planar surface lying on a plane intersecting two planes coincident with the planes of adjacent sawn planar surfaces whereby said lens element has a polygonal cross section normal to the lens axis, and B) means for supporting said plurality of optical elements to form a lens system.

6. An optical device as recited in claim 5 wherein said plurality of optical elements includes at least one lens element with polygonal cross sections.

7. An optical device as recited in claim 6 wherein said at least one lens element has an octagonal cross section with eight sawn planar surfaces.

8. An optical device as recited in claim 7 wherein each sawn surface has an equal width whereby said at least one lens element has a regular octagonal cross section.

* * * * *